United States Patent [19]
Doniat et al.

[11] Patent Number: 5,229,228
[45] Date of Patent: Jul. 20, 1993

[54] CURRENT COLLECTOR/SUPPORT FOR A LEAD/LEAD OXIDE BATTERY

[75] Inventors: Denis Doniat, Le Perreux; Guy Bronoel, Versailles; Serge Besse, Ivry-sur-Seine; Noëlle Tassin, Fontenay-sous-Bois, all of France

[73] Assignee: Sorapec S.A., Fontenay-sous-Bois, France

[21] Appl. No.: 705,370

[22] Filed: May 24, 1991

[30] Foreign Application Priority Data

May 25, 1990 [FR] France ................. 90 06750

[51] Int. Cl.$^5$ ............................. H01M 4/68
[52] U.S. Cl. ....................... 429/234; 429/241
[58] Field of Search ................. 429/234, 241

[56] References Cited

U.S. PATENT DOCUMENTS

| | | | |
|---|---|---|---|
| 2,616,165 | 11/1952 | Brennan | 429/235 X |
| 4,439,916 | 4/1984 | Faber | 429/234 X |
| 4,865,933 | 9/1989 | Blanyer et al. | 429/234 X |

FOREIGN PATENT DOCUMENTS

| | | | |
|---|---|---|---|
| 57-210569 | 12/1982 | Japan. | |
| 58-115767 | 7/1983 | Japan. | |
| 635540 | 11/1978 | U.S.S.R. | 429/234 |

*Primary Examiner*—Stephen Kalafut
*Attorney, Agent, or Firm*—Sandler Greenblum & Bernstein

[57] ABSTRACT

Collector support for lead/lead oxide batteries is made of a screen of electrolyte-resistant polymer coated with a conductive underlayer and a layer of lead or a lead rich alloy having a mass per surface comprised between 30 and 40 g/dm$^2$ relative to the projected surface area of the collector support. The dimensions of the screen are such that no point inside the screen pattern is located at a distance greater than 2.5 mm from any strand of the screen.

22 Claims, 1 Drawing Sheet

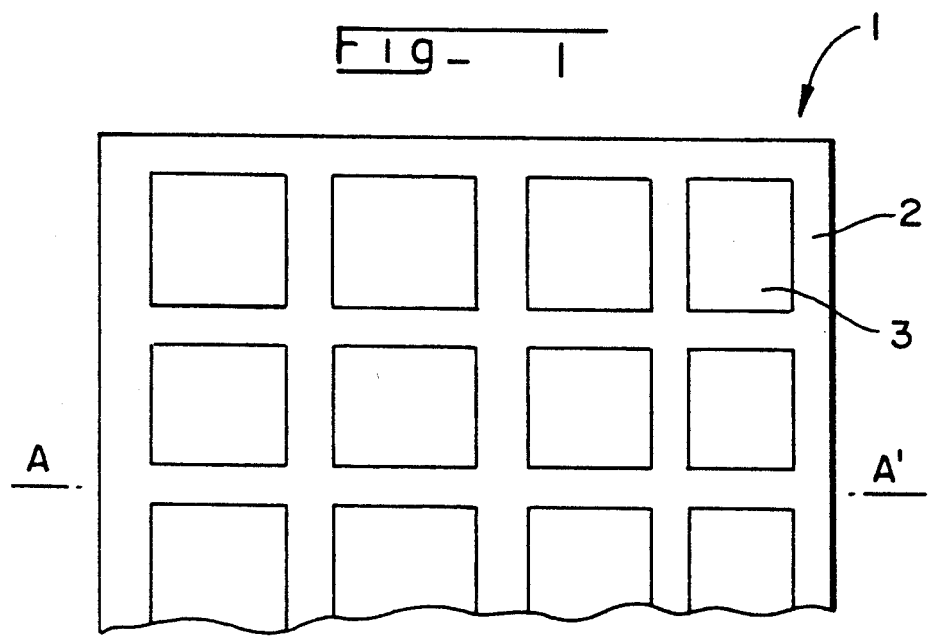
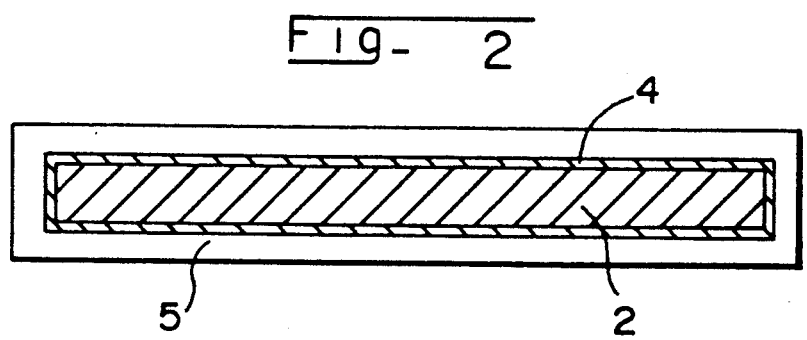

CURRENT COLLECTOR/SUPPORT FOR A LEAD/LEAD OXIDE BATTERY

BACKGROUND OF THE INVENTION

The present invention concerns a collector support for lead/lead oxide batteries.

In this and other types of batteries, the electrodes are made of a support which confers mechanical strength and long-term geometrical stability. The support, made of an inert mineral or organic material, is usually covered or coated with one or more conductive layers which serve to facilitate the mobilization and flow of electrons mobilized during the charging or discharging process. For this reason, these supports are sometimes called current collectors or "collector supports" which term will be used herein. To make an electrode, active material is pasted onto this collector support, the electrode being formed by this assembly.

The manufacture of lightweight collector supports made of a core of polymer coated with lead has already been suggested for the electrodes of lead/lead oxide batteries with high energy per mass. The invention is based on the observation that to obtain good performance both per mass and per volume, especially during extreme conditions of charge and discharge, it is essential to precisely define the geometrical shape of the collector supports and their dimensions. Furthermore, the cohesion of the active materials must be maintained to achieve long electrode lifetimes, especially for positive electrodes, which in particular also require close control of the collector support's geometrical configuration.

As will be explained below, taking into consideration all of these constraints is not at all easy inasmuch as some of the parameters in question are contradictory, and vary oppositely to one another, especially in a non-linear manner. According to the operating conditions encountered, the variations of one and the same parameter may occur in one direction or in the opposite direction.

After extensive tests, the Applicant has developed a collector support whose structure and constitution enable the production of highly efficient electrodes for lead/lead oxide batteries, bearing in mind the non-linear phenomena set out above and their often erratic and surprising evolution.

SUMMARY OF THE INVENTION

According to the invention, a current collector support for lead/lead oxide batteries is thus made of an electrolyte-resistant polymer screen coated with a conductive sub-layer and with a layer of lead or lead-rich alloy having a mass per surface area comprised between 30 and 40 $g/dm^2$. The dimensions of the screen are such that no point inside the screen pattern is located at a distance greater than 2.5 mm from any strand of the screen.

By "mass per surface area comprised between 30 and 40 $g/dm^2$" is meant the mass relative to the projected surface area of the collector support, and not relative to only that surface area occupied by the strands making up the screen. This surface corresponds to the apparent surface area such as would be obtained by projecting the screen onto a plane parallel to itself, including its strands and openings. The values "30 to 40 $g/dm^2$" for the mass per surface area is an ideal range of values, in that an amount of 30 $g/dm^2$ provides good draining of the electronic charges by the lead or lead-rich alloy, while beyond 40 $g/dm^2$, the improvement obtained in the properties becomes too small.

Preferably, the conductive underlayer is made of copper or lead and its thickness is less than 5 $\mu m$, whereas the layer of lead or lead-rich alloy is an electrolytically deposited layer, for example, of lead/antimony.

It is also preferable for the screen to be rectangular with openings of dimensions comprised between 3 and 5 mm along the short side and comprised between 10 and 20 mm along the long side, the thickness of the collector support, before coating with the layers and underlayers, being comprised between 1 and 4 mm. A good screen dimension is 4×15 mm. By "opening" is meant the free surface of the screen, i.e. the spacing between two adjacent strands, side-by-side.

As a variation, especially for making positive electrodes but also useful for negative electrodes, the collector support is made of a first central screen with a square or diamond-shaped pattern and two further lateral screens fixed to the first screen. The central screen is fixed to these lateral screens at the point of contact of the constituent strands, for example by welding or by means of an adhesive.

Advantageously, the strand thickness of the central screen is comprised between 1 and 4 mm and the lateral screens have at least one dimension less than 3 mm. The strand thickness of the lateral screen may in turn be comprised between 0.5 and 1.5 mm.

Preferably, the central screen has large openings, for example square openings with sides measuring 20 mm and the openings of the lateral screens are smaller, for example square openings with sides measuring 3 to 3.3 mm.

The collector support can be prepared by a method which consists in:
- cutting a support of polyethylene or polypropylene or other material resistant to electrolytes, in particular sulfuric acid,
- advantageously, etching the support, for example with a concentrated sulfochromic mixture or by glow discharge,
- depositing a conductive underlayer, for example by chemical reduction, or by cathodic sputtering or vacuum deposition for lead or copper, and
- depositing a constant surface-enveloping mass of lead for example by electrolysis in a fluoroborate-based bath, or lead or a lead/antimony alloy by electroplating.

When the collector support comprises a central screen and two lateral screens, only the lateral screens, or all of the screens, may be covered by the underlayer and the layer.

The electrode is made by pasting the active mass, usually a paste of lead oxide with sulfuric acid and various additives, in the free spaces of the screen and applying the paste under pressure, for example at 100 $kg/cm^2$.

BRIEF DESCRIPTION OF THE DRAWINGS

FIG. 1 illustrates a front view of the collector support according to the present invention; and FIG. 2 illustrates a cross-section view taken along A—A' in FIG. 1.

DETAILED DESCRIPTION

Preferred embodiments of the invention will now be described by way of example.

EXAMPLE 1

A collector support 1 is prepared by cutting a support of polypropylene, to produce a rectangular mesh pattern or screen 2 whose openings 3 measure 15 mm×4 mm. This support is etched in a concentrated sulfochromic mixture during three hours at a temperature comprised between 60° and 80° C., then for twenty hours at ambient temperature. A conductive underlayer 4 of copper less than 5μm thick is then deposited by chemical reduction, then a constant surface-covering mass 5 of lead of 30 g/dm² is deposited electrolytically in a fluoroborate-based bath.

To complete the electrode, the thus-prepared collector support is pasted with a lead oxide based pasty active mass in the free spaces of the screen and compacted at 100 kg/cm² or by lamination.

After leaving to rest during 72 hours in ambient air, the electrode is developed in a $H_2SO_4$ solution of density 1.07 during 60 hours while charging at a rate of 0.1 C (where C is the theoretical capacity), then discharged at the rate of 0.1 C.

To determine the capacity, the electrode is immersed in a $H_2SO_4$ solution of density 1.25, then charged at 0.1 C during 11 hours and discharged at 0.1 C until $V_{cell}(Pb\text{-}PbO_2) = 1.8$ V.

The Faraday efficiency of the thus-produced electrode is thus determined by the ratio of the electric capacity restituted by discharge to the theoretical capacity given by the mass of active material used to paste the collector support, namely a theoretical capacity of 259 mA/g of dry material. The efficiency thus found is 61% at C/10 (where C represents the theoretical capacity, while 10 represents the number of hours; in this instance, the expression C/10 means ten hours of charging or discharging).

For this same electrode, the capacity per volume is measured, where the reference volume is the total volume of the electrode. It is found that these capacities are respectively 553 mA/cm³ for C/10 rates and 240 mA/cm³ for a rate of 2C (charge or discharge over half an hour).

COMPARATIVE EXAMPLES

A series of electrodes is made as indicated in the previous Example, but with a square screen having an opening of 2 mm, 5 mm or 10 mm respectively, as set out in the Table below. The efficiencies, capacity per volume and capacity per mass are then measured and the results are given in the Tables below, in which C/20 indicates a rate of charging or discharging of twenty hours.

| Rate of Discharge | a = 2 mm | a = 5 mm | a = 10 mm |
|---|---|---|---|
| | | Efficiency % | |
| C/20 | 64 | 60.4 | 60 |
| C/10 | 55 | 49.5 | 48 |
| 2C | 35 | 23 | 21 |

Firstly, it is observed that the efficiency increases as the screen size decreases.

However, if the capacities per volume are compared, the following results are obtained:

| Rate of Discharge | a = 2 mm | a = 5 mm | a = 10 mm |
|---|---|---|---|
| | | Capacity per volume mAh/cm³ | |
| C/20 | 442 | 470 | 490 |
| 2C | 242 | 180 | 170 |

For low rates, the capacities per volume of the electrodes with screens of smallest dimensions are the lowest, but however at more severe rates (2C) the opposite occurs. The same can be said for the capacities per mass of the electrodes:

| Rate of Discharge | a = 2 mm | a = 5 mm | a = 10 mm |
|---|---|---|---|
| | | Capacity per mass mAh/g | |
| C/20 | 98 | 106 | 109 |
| 2C | 53.5 | 40.5 | 37.8 |

Attention is drawn to the fact that variations in the obtained results cannot be deduced from variations of the parameters concerned and, consequently, the selection according to the invention is not the result of simple interpolation.

EXAMPLE 2

An electrode is prepared as described in Example 1, but whose structure is more complex to the extent that the collector support is firstly made up of a first central screen with large square openings measuring 20 mm along the side, this screen being 3 mm thick. It is surrounded by two lateral screens secured by welding to the central screen. The openings of the lateral screens measure 3.3 mm. An underlayer of copper and a layer of lead completely cover all of the strands of all of the screens, which are pasted with the same active material as in Example 1.

It is found that this electrode has a particularly good resistance to splitting, which is a well known problem with lead/lead acid batteries. This excellent resistance to splitting is maintained even in severe conditions of charge-discharge cycling.

We claim:

1. A current collector support for lead/lead oxide batteries having openings capable of receiving a lead oxide based pasty active mass, comprising:
    an electrolyte-resistant polymer screen, said screen having dimensions wherein no point inside the screen is located at a distance greater than 2.5 mm from any strand of the screen;
    a conductive underlayer coated on stands of said screen; and
    a lead or lead-rich alloy layer on said conductive underlayer, said lead or lead-rich alloy layer having a mass per surface area comprised between 30 and 40 g/dm² relative to the projected surface of the collector support, and providing openings capable of receiving a lead oxide based pasty active mass.

2. The collector support according to claim 1, wherein said conductive underlayer has a thickness of less than 5μm.

3. The collector support according to claim 1, wherein said lead or lead-rich alloy layer is an electrolytically deposited layer.

4. The collector support according to claim 1, wherein said screen is rectangular.

5. The collector support according to claim 4, wherein said screen includes a short side and a long side, and includes openings having dimensions of between 3 and 5 mm along the short side, and between 10 and 20 mm along the long side.

6. The collector support according to claim 5, wherein said screen has a thickness of between 1 and 4 mm.

7. The collector support according to claim 6, wherein said screen has openings of 4×15 mm.

8. The collector support according to claim 1, wherein said screen comprises a first central screen having a square or a diamond-shaped pattern, and two lateral screens fixed to said first central screen.

9. The collector support according to claim 8, wherein said central screen has a strand thickness of between 1 and 4 mm, and said two lateral screens have at least one dimension less than 3 mm.

10. The collector support according to claim 8, wherein said two lateral screens have a strand thickness of between about 0.5 and 1.5 mm.

11. The collector support according to claim 8, wherein said central screen comprises openings having sides 20 mm in length, and said two laterals screens have openings 3.3 mm in length.

12. A positive electrode of a lead-acid battery, comprising:
at least one collector support, comprising:
an electrolyte-resistant polymer screen, said screen having dimensions wherein no point inside the screen is located at a distance greater than 2.5 mm from any strand of the screen;
a conductive underlayer coated on strands of said screen; and
a lead or lead-rich alloy layer on said conductive underlayer, said lead or lead-rich alloy layer having a mass per surface area comprised between 30 and 40 $g/dm^2$ relative to the projected surface of the collector support; and
an active mass within openings of said at least one collector support.

13. The positive electrode according to claim 12, wherein said conductive underlayer has a thickness of less than 5μm.

14. The positive electrode according to claim 12, wherein said lead or lead-rich alloy layer is an electrolytically deposited layer.

15. The positive electrode according to claim 12, wherein said screen is rectangular.

16. The positive electrode according to claim 15, wherein said screen includes a short side and a long side, and includes openings having dimensions of between 3 and 5 mm along the short side, and between 10 and 20 mm along the long side.

17. The positive electrode according to claim 16, wherein said screen has a thickness of between 1 and 4 mm.

18. The positive electrode according to claim 17, wherein said screen has openings of 4×15 mm.

19. The positive electrode according to claim 12, wherein said screen comprises a first central screen having a square or a diamond-shaped pattern, and two lateral screens fixed to said first central screen.

20. The positive electrode according to claim 19, wherein said central screen has a strand thickness of between 1 and 4 mm, and said two lateral screens have at least one dimension less than 3 mm.

21. The positive electrode according to claim 19, wherein said two lateral screens have a strand thickness of between about 0.5 and 1.5 mm.

22. The positive electrode according to claim 19, wherein said central screen comprises openings having sides 20 mm in length, and said two laterals screens have openings 3.3 mm in length.

* * * * *